United States Patent
Furuse et al.

(10) Patent No.: US 7,923,860 B2
(45) Date of Patent: Apr. 12, 2011

(54) SWITCHING POWER SUPPLY CIRCUIT CAPABLE OF TIMING ADJUSTMENT OF SIGNAL

(75) Inventors: Katsuhisa Furuse, Kawanishi (JP); Yasuhiro Ishizaka, Minoo (JP); Senta Sekido, Amagasaki (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 12/358,381

(22) Filed: Jan. 23, 2009

(65) Prior Publication Data
US 2009/0195071 A1 Aug. 6, 2009

(30) Foreign Application Priority Data

Jan. 31, 2008 (JP) ................................. 2008-020320

(51) Int. Cl.
*H02M 1/38* (2007.01)
(52) U.S. Cl. ................ 307/31; 307/14; 307/32; 307/38; 307/41
(58) Field of Classification Search .................... 307/14, 307/31–32, 38, 41
See application file for complete search history.

(56) References Cited

U.S. PATENT DOCUMENTS

| | | | | |
|---|---|---|---|---|
| 5,875,104 A | * | 2/1999 | Prager | 363/65 |
| 6,265,855 B1 | * | 7/2001 | Aas et al. | 323/272 |
| 6,628,106 B1 | * | 9/2003 | Batarseh et al. | 323/222 |
| 7,215,102 B2 | * | 5/2007 | Harris et al. | 323/268 |
| 7,268,448 B2 | * | 9/2007 | Hasegawa | 307/31 |
| 7,276,885 B1 | * | 10/2007 | Tagare | 323/267 |
| 7,304,459 B2 | * | 12/2007 | Kazuma | 323/282 |
| 7,433,439 B1 | * | 10/2008 | Richmond | 375/371 |
| 7,518,263 B2 | * | 4/2009 | Gan et al. | 307/32 |
| 7,576,521 B2 | * | 8/2009 | Komiya | 323/268 |
| 7,706,151 B2 | * | 4/2010 | Neidorff et al. | 363/9 |
| 7,714,549 B2 | * | 5/2010 | Takemura | 323/244 |
| 2006/0164366 A1 | * | 7/2006 | Yu et al. | 345/98 |

FOREIGN PATENT DOCUMENTS

| | | |
|---|---|---|
| JP | 49-17203 | 5/1974 |
| JP | 3448583 | 7/2003 |
| JP | 2004-7584 | 1/2004 |
| JP | 2005-160128 | 6/2005 |
| JP | 2005-269736 | 9/2005 |
| JP | 3718830 | 9/2005 |

* cited by examiner

*Primary Examiner* — Jared J Fureman
*Assistant Examiner* — Adi Amrany
(74) *Attorney, Agent, or Firm* — Cooper & Dunham LLP (57) ABSTRACT

A switching power supply circuit includes a plurality of switching regulators and a timing adjustment circuit. The plurality of switching regulators converts an input voltage input to an input terminal into a plurality of predetermined constant voltages, and outputs the plurality of predetermined constant voltages from a plurality of output terminals, respectively. The timing adjustment circuit adjusts phases of a plurality of pulse signals generated by the plurality of switching regulators so that the phases of the plurality of pulse signals are different from each other, and outputs the plurality of adjusted pulse signals to respective switch circuits of the plurality of switching regulators.

13 Claims, 10 Drawing Sheets

CLK1

CLK2

EAo1

EAo1 WHEN LOAD IS HEAVY
TW1
EAo1 WHEN LOAD IS LIGHT

EAo2

EAo2 WHEN LOAD IS HEAVY
TW2
EAo2 WHEN LOAD IS LIGHT

EXTi1

FLUCTUATION WIDTH OF FALLING EDGE

EXTi2

FLUCTUATION WIDTH OF FALLING EDGE

SWITCHING POWER SUPPLY CIRCUIT CAPABLE OF TIMING ADJUSTMENT OF SIGNAL

BACKGROUND

1. Technical Field

The present specification describes a switching power supply circuit, and more particularly, a switching power supply circuit used as a power supply circuit in electronic devices.

2. Discussion of the Background

Figure 1:
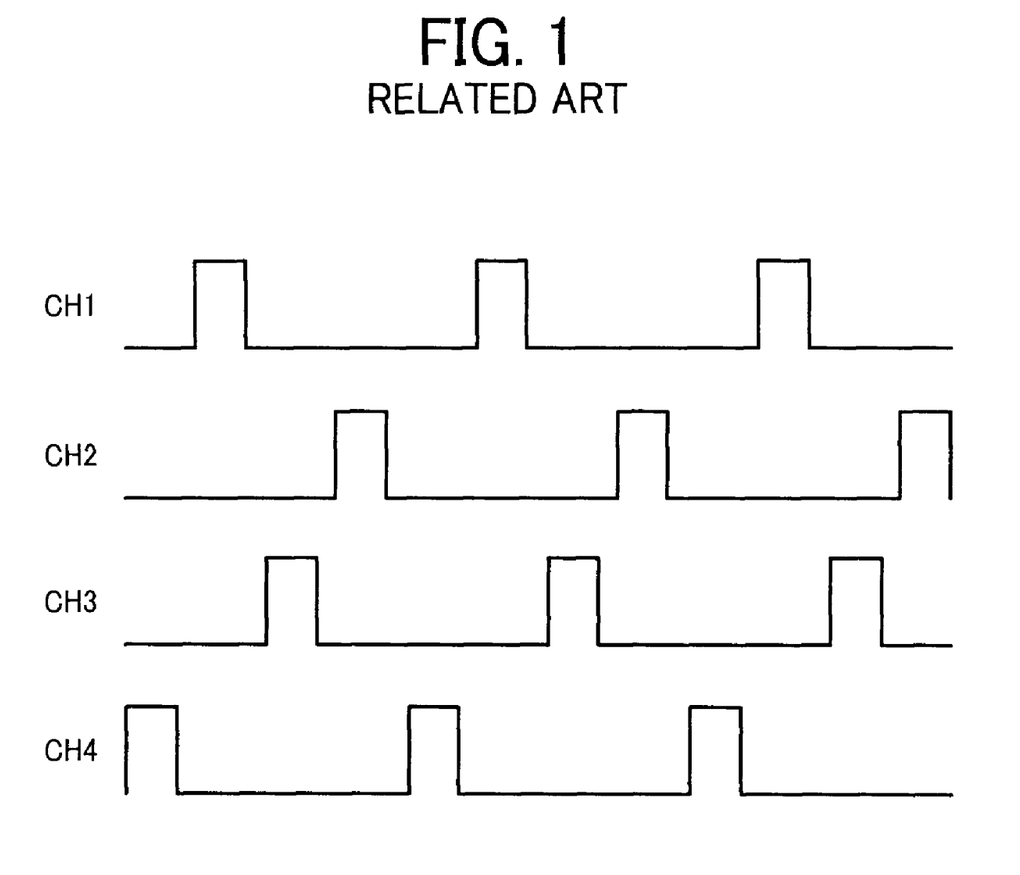
FIG. 1 is a timing chart illustrating switching timings of a related-art four-channel DC-DC converter.

Related-art multi-channel DC-DC converters include a plurality of DC-DC converters mounted on a single semiconductor chip. For example, a four-channel DC-DC converter includes four DC-DC converters CH1, CH2, CH3, and CH4, as illustrated in FIG. 1.

In such four-channel DC-DC converter, an initial switching phase is designed in such a manner that the timing with which each of the DC-DC converters CH1, CH2, CH3, and CH4 is turned on (i.e., is at a high level) is shifted from each other so that they do not overlap, thus preventing generation of noise and consequent malfunction of the DC-DC converter. Operation of such a DC-DC converter is described below.

Figure 2A:
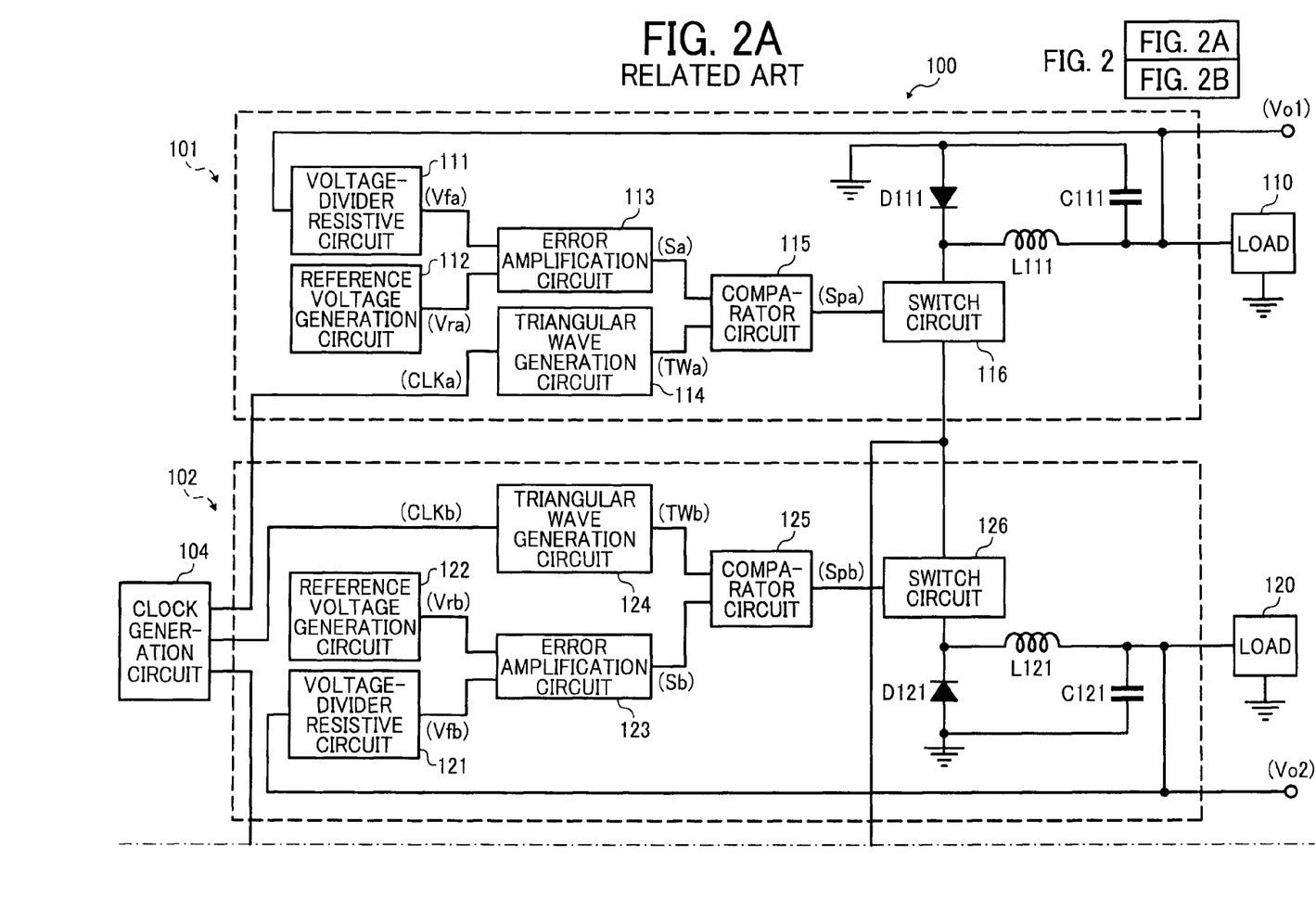
FIGS. 2A and 2B illustrate a circuit diagram of a related-art three-channel DC-DC converter.
Figure 2B:
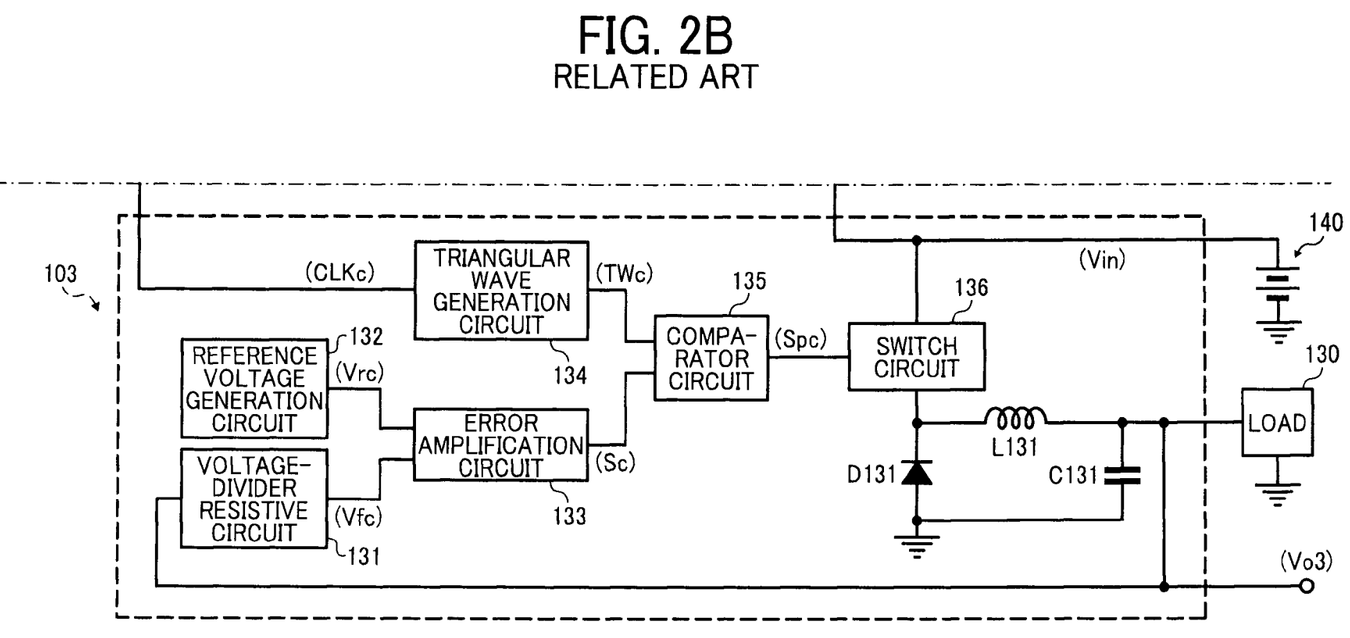
Figure 3:
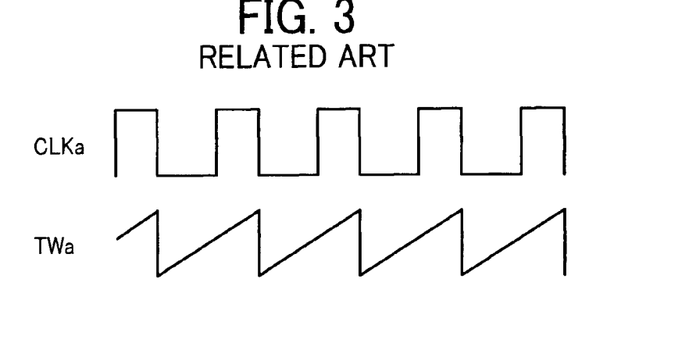
FIG. 3 is a timing chart illustrating a relation between a clock signal and a triangular wave signal of the three-channel DC-DC converter shown in FIGS. 2A and 2B.

FIGS. 2A and 2B together illustrate a circuit diagram of a related-art three-channel DC-DC converter 100. The three-channel DC-DC converter 100 converts an input voltage Vin input from a power supply 140 into output voltages Vo1, Vo2, and Vo3, respectively. The three-channel DC-DC converter 100 includes three step-down switching regulators 101, 102, and 103. In the switching regulator 101, a voltage-divider resistive circuit 111 divides an output voltage Vo1 into a divided voltage Vfa. An error amplification circuit 113 amplifies a difference voltage between the divided voltage Vfa and a reference voltage Vra generated from a reference voltage generation circuit 112, and outputs an amplified voltage as an error signal Sa. A triangular wave generation circuit 114 generates a triangular wave signal TWa based on a clock signal CLKa output from a clock generation circuit 104. As illustrated in FIG. 3, a phase of the triangular wave signal TWa corresponds to a frequency of the clock signal CLKa. As illustrated in FIG. 2A, a comparator circuit 115 compares a voltage of the error signal Sa output from the error amplification circuit 113 with a voltage of the triangular wave signal TWa output from the triangular wave generation circuit 114 to generate a switching pulse signal Spa for performing PWM (pulse width modulation) control, and outputs the switching pulse signal Spa to a switch circuit 116.

Figure 4:
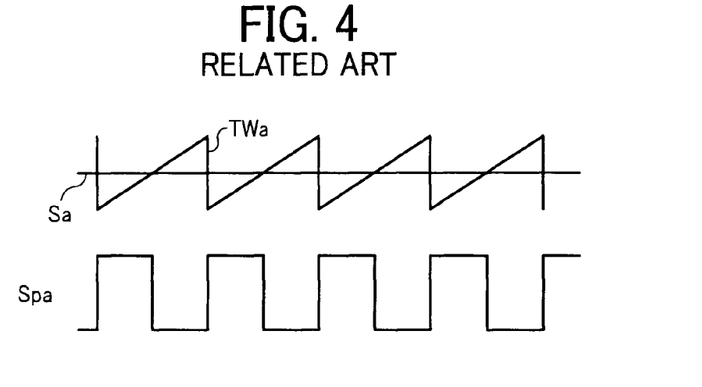
FIG. 4 is a timing chart illustrating an example of an error signal, a triangular wave signal, and a pulse signal of the three-channel DC-DC converter shown in FIGS. 2A and 2B.

As illustrated in FIG. 4, when the switching pulse signal Spa is at a high level, the switch circuit 116 depicted in FIG. 2A is turned on and becomes conductive. By contrast, when the switching pulse signal Spa is at a low level, the switch circuit 116 is turned off and interrupted. As illustrated in FIG. 2A, when the switch circuit 116 is turned on, an electric current value of a coil L111 increases. By contrast, when the switch circuit 116 is turned off, a diode D111 is turned on and the electric current value of the coil L111 decreases. A smoothing capacitor C111 smoothes a ripple voltage generated when the switch circuit 116 is turned on and off, and outputs a smoothed voltage as an output voltage Vo1.

The switching regulators 102 and 103 perform operations similar to the above-described operations performed by the switching regulator 101.

Figure 5:
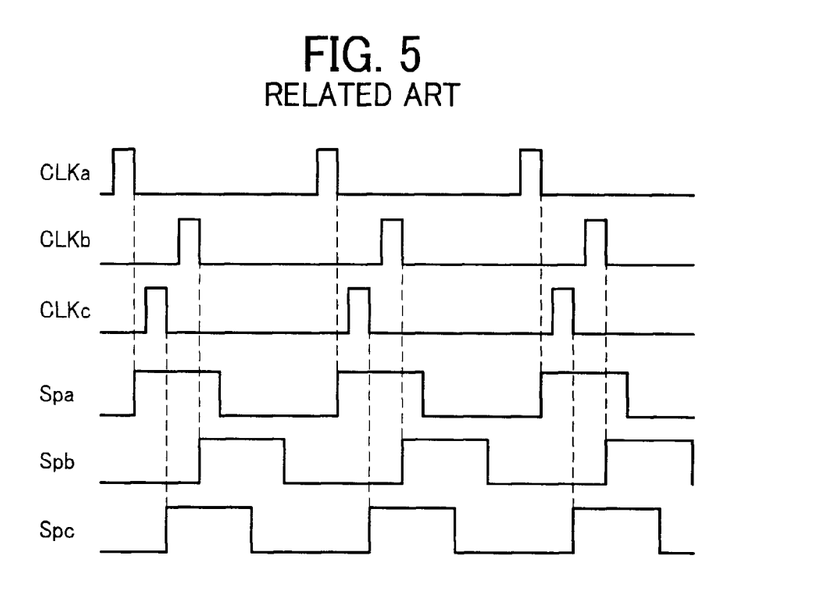
FIG. 5 is a timing chart illustrating another example of clock signals and pulse signals of the three-channel DC-DC converter shown in FIGS. 2A and 2B.

As illustrated in FIGS. 2A and 2B, clock signals CLKa, CLKb, and CLKc output from the clock generation circuit 104 are input to triangular wave generation circuits 114, 124, and 134 of the switching regulators 101, 102, and 103, respectively. FIG. 5 is a timing chart illustrating a relation between the clock signals CLKa, CLKb, and CLKc input to the triangular wave generation circuits 114, 124, and 134, respectively, and switching pulse signals Spa, Spb, and Spc output under stable output voltages Vo1, Vo2, and Vo3 and constant loads 110, 120, and 130 depicted in FIGS. 2A and 2B, respectively.

As illustrated in FIG. 5, phases of the clock signals CLKa, CLKb, and CLKc are shifted from each other. FIG. 5 illustrates an example control for controlling timings for turning on switch circuits 116, 126, and 136 depicted in FIGS. 2A and 2B in synchrony with falling edges of the clock signals CLKa, CLKb, and CLKc, respectively. Alternatively, the switch circuits 116, 126, and 136 may be turned on in synchrony with rising edges of the clock signals CLKa, CLKb, and CLKc, respectively.

Further, in FIG. 5, when the switching pulse signals Spa, Spb, and Spc are at high levels, respectively, the switch circuits 116, 126, and 136 are turned on. Alternatively, the switch circuits 116, 126, and 136 may be turned on when the switching pulse signals Spa, Spb, and Spc are at low levels, respectively.

Shifting the phases of the clock signals CLKa, CLKb, and CLKc from each other to control switching phases for turning on the switch circuits 116, 126, and 136, respectively, can prevent the switch circuits 116, 126, and 136 from being turned on simultaneously, and thereby can reduce noise caused by overlapping timing for turning on the switch circuits 116, 126, and 136.

Under conditions of constant loads and stable output voltages, an arrangement like that described above is sufficient. However, fluctuation in loads and output voltages may change time periods when the switch circuits 116, 126, and 136 are turned on, and consequently timings for turning off the switch circuits 116, 126, and 136 may overlap.

Figure 6:
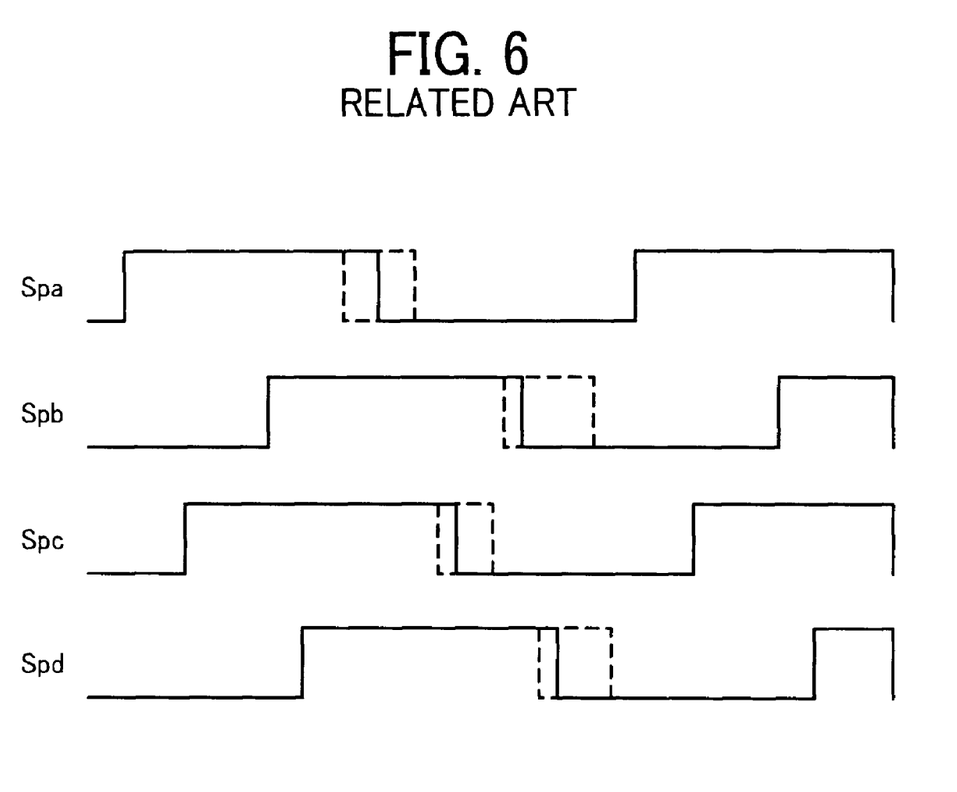
FIG. 6 is a timing chart illustrating pulse signals of another related-art DC-DC converter.

FIG. 6 is a timing chart illustrating switching pulse signals Spa, Spb, Spc, and Spd output under constant loads and stable output voltages. The switching pulse signals Spa, Spb, Spc, and Spd output under constant loads are illustrated in solid lines. The switching pulse signals Spa, Spb, Spc, and Spd output for turning off under fluctuated loads or output voltages are illustrated in broken lines.

When a number of channels of the DC-DC converter 100 depicted in FIGS. 2A and 2B increases or when fluctuation in pulse signal width within which the switch circuits 116, 126, and 136 are turned off is great, timings for turning off the switch circuits 116, 126, and 136 may overlap. For example, a timing of the switching pulse signal Spb for turning off the switch circuit 126 may overlap a timing of the switching pulse signal Spd for turning off a switch circuit of an added switching regulator. Consequently, the overlapped timings may generate a large electric current and noise, resulting in a malfunction of the DC-DC converter 100.

SUMMARY

This patent specification describes a novel switching power supply circuit. One example of a novel switching power supply circuit includes a plurality of switching regulators and a timing adjustment circuit. The plurality of switching regulators is configured to convert an input voltage input to an input terminal into a plurality of predetermined constant voltages and to output the plurality of predetermined constant voltages from a plurality of output terminals, respectively. Each of the plurality of switching regulators includes a switch circuit, a coil, and a control circuit. The switch circuit is configured to perform switching according to an input control signal. The coil is charged with the input voltage by the switching performed by the switch circuit. The control circuit is configured to compare a voltage of a triangular wave signal with a voltage of a signal obtained by amplifying a difference voltage between a proportional voltage proportional to an output voltage to be output from the output terminal and a predetermined reference voltage. The control circuit is configured to output a pulse signal indicating a result of the comparison to control the switching performed by the switch circuit. The timing adjustment circuit is configured to adjust phases of a plurality of pulse signals generated by the plurality of switching regulators so that the phases of the plurality of pulse signals are different from each other, and to output the plurality of adjusted pulse signals to the respective switch circuits of the plurality of switching regulators.

BRIEF DESCRIPTION OF THE DRAWINGS

A more complete appreciation of the aforementioned aspects, features and advantages thereof will be readily obtained as the same becomes better understood by reference to the following detailed description when considered in connection with the accompanying drawings, wherein.

DETAILED DESCRIPTION OF THE EXEMPLARY EMBODIMENTS

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 7:
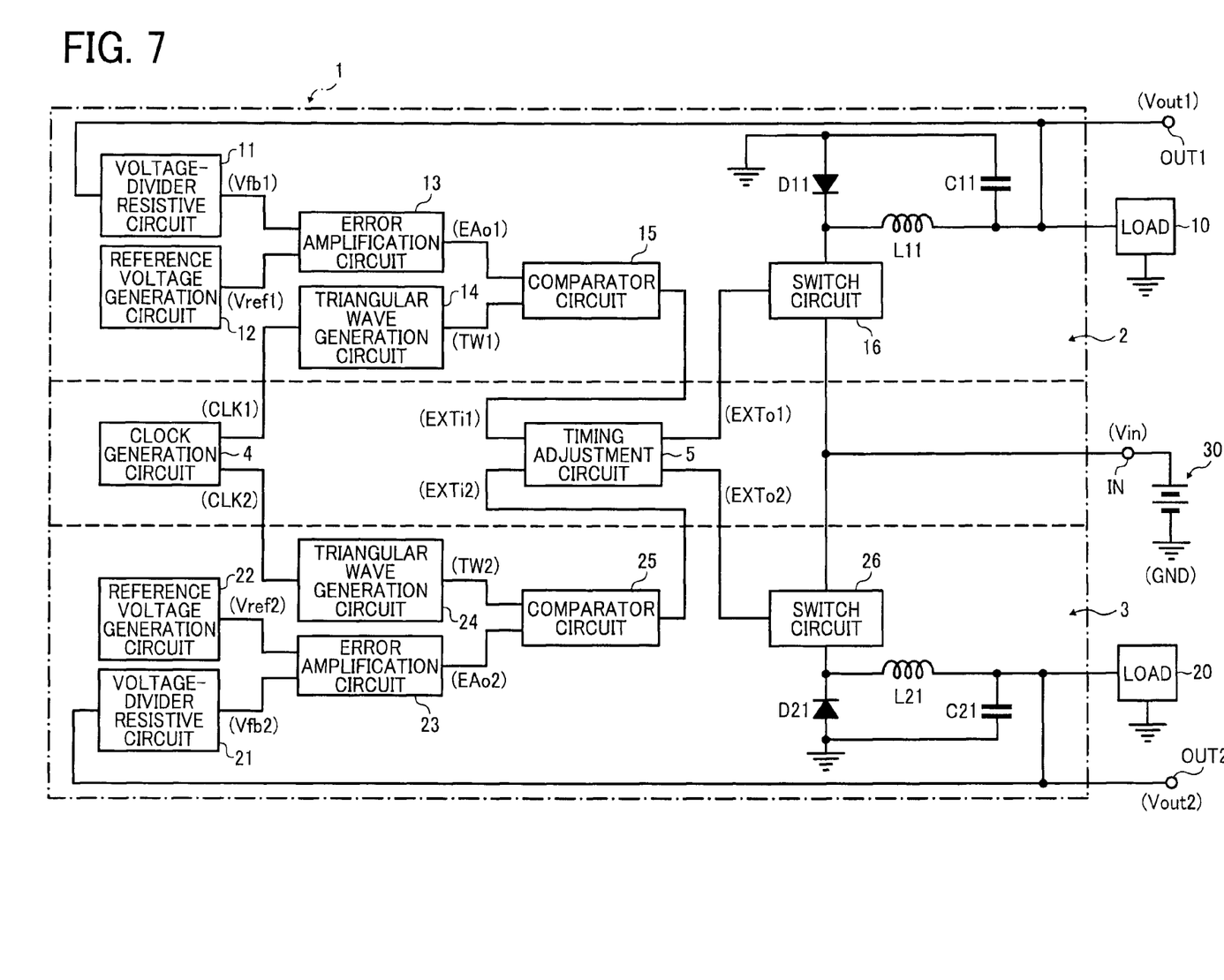
FIG. 7 is a circuit diagram of a switching power supply circuit according to an exemplary embodiment.

Referring now to the drawings, wherein like reference numerals designate identical or corresponding parts throughout the several views, in particular to FIG. 7, a switching power supply circuit 1 according to an exemplary embodiment is explained.

FIG. 7 is a circuit diagram of the switching power supply circuit 1. The switching power supply circuit 1 includes a direct-current power supply 30, an input terminal IN, output terminals OUT1 and OUT2, a first switching regulator 2, a second switching regulator 3, a clock generation circuit 4, a timing adjustment circuit 5, and loads 10 and 20.

The first switching regulator 2 includes a voltage-divider resistive circuit 11, a reference voltage generation circuit 12, an error amplification circuit 13, a triangular wave generation circuit 14, a comparator circuit 15, a switch circuit 16, a rectifier diode D11, a coil L11, and a capacitor C11.

The second switching regulator 3 includes a voltage-divider resistive circuit 21, a reference voltage generation circuit 22, an error amplification circuit 23, a triangular wave generation circuit 24, a comparator circuit 25, a switch circuit 26, a rectifier diode D21, a coil L21, and a capacitor C21.

The switching power supply circuit 1 serves as a two-channel DC-DC converter including two switching regulators. The switching power supply circuit 1 converts an input voltage Vin input to the input terminal IN from the direct-current power supply 30 into two predetermined constant voltages, and outputs the constant voltages from the output terminals OUT1 and OUT2 as output voltages Vout1 and Vout2, respectively.

The clock generation circuit 4 generates a predetermined clock signal CLK1 and outputs the clock signal CLK1 to the first switching regulator 2. The clock generation circuit 4 also generates a predetermined clock signal CLK2 and outputs the clock signal CLK2 to the second switching regulator 3. The first switching regulator 2 converts the input voltage Vin into a predetermined constant voltage, and outputs the constant voltage from the output terminal OUT1 as the output voltage Vout1. The first switching regulator 2 also outputs the constant voltage to the load 10. The second switching regulator 3 converts the input voltage Vin into a predetermined constant voltage, and outputs the constant voltage from the output terminal OUT2 as the output voltage Vout2. The second switching regulator 3 also outputs the constant voltage to the load 20.

In the first switching regulator 2, the voltage-divider resistive circuit 11 divides the output voltage Vout1 to generate and output a divided voltage Vfb1. The reference voltage generation circuit 12 generates and outputs a predetermined reference voltage Vref1. The error amplification circuit 13 amplifies a difference voltage between the divided voltage Vfb1 and the reference voltage Vref1 to generate and output an error signal EAo1. The triangular wave generation circuit 14 generates and outputs a predetermined triangular wave signal TW1 from the clock signal CLK1. The comparator circuit 15 compares a voltage of the error signal EAo1 with a voltage of the triangular wave signal TW1 to generate and output a pulse signal EXTi1 indicating a result of the comparison. The switch circuit 16 performs a switching operation for output control of the input voltage Vin. The capacitor C11 serves as a smoothing capacitor.

Similarly, in the second switching regulator 3, the voltage-divider resistive circuit 21 divides the output voltage Vout2 to generate and output a divided voltage Vfb2. The reference voltage generation circuit 22 generates and outputs a predetermined reference voltage Vref2. The error amplification circuit 23 amplifies a difference voltage between the divided voltage Vfb2 and the reference voltage Vref2 to generate and output an error signal EAo2. The triangular wave generation circuit 24 generates and outputs a predetermined triangular wave signal TW2 from the clock signal CLK2. The comparator circuit 25 compares a voltage of the error signal EAo2 with a voltage of the triangular wave signal TW2 to generate and output a pulse signal EXTi2 indicating a result of the comparison. The switch circuit 26 performs a switching operation for output control of the input voltage Vin. The capacitor C21 serves as a smoothing capacitor.

The timing adjustment circuit 5 serves as a timing adjustment circuit portion. The divided voltages Vfb1 and Vfb2 serve as proportional voltages, respectively. The voltage-divider resistive circuit 11, the reference voltage generation circuit 12, the error amplification circuit 13, the triangular wave generation circuit 14, and the comparator circuit 15 serve as a control circuit. Similarly, the voltage-divider resistive circuit 21, the reference voltage generation circuit 22, the error amplification circuit 23, the triangular wave generation circuit 24, and the comparator circuit 25 serve as a control circuit.

The pulse signals EXTi1 and EXTi2 output from the comparator circuits 15 and 25, respectively, are input to the timing adjustment circuit 5. The timing adjustment circuit 5 performs phase control of the pulse signals EXTi1 and EXTi2, and outputs the controlled signals to the switch circuits 16 and 26 as pulse signals EXTo1 and EXTo2, respectively. The switch circuits 16 and 26 are turned on and off according to the input pulse signals EXTo1 and EXTo2, respectively. When the switch circuits 16 and 26 are turned on, the switch circuits 16 and 26 are conductive. When the switch circuits 16 and 26 are turned off, the switch circuits 16 and 26 are interrupted.

In the first switching regulator 2, the switch circuit 16 connects the input voltage Vin to a cathode of the rectifier diode D11. An anode of the rectifier diode D11 is connected to a ground voltage GND. The coil L11 connects a connecting portion provided between the switch circuit 16 and the rectifier diode D11 to the output terminal OUT1. The capacitor C11 connects the output terminal OUT1 to a ground voltage GND.

Similarly, in the second switching regulator 3, the switch circuit 26 connects the input voltage Vin to a cathode of the rectifier diode D21. An anode of the rectifier diode D21 is connected to a ground voltage GND. The coil L21 connects a connecting portion provided between the switch circuit 26 and the rectifier diode D21 to the output terminal OUT2. The capacitor C21 connects the output terminal OUT2 to a ground voltage GND.

With the above-described configuration, in the first switching regulator 2, when the output voltage Vout1 increases, a voltage of the error signal EAo1 output from the error amplification circuit 13 decreases. Accordingly, a pulse width of the pulse signal EXTi1 output from the comparator circuit 15 changes. Consequently, a time period for which the switch circuit 16 is turned on is shortened and controlled to decrease the output voltage Vout1. By contrast, when the output voltage Vout1 decreases, a voltage of the error signal EAo1 output from the error amplification circuit 13 increases. Accordingly, a pulse width of the pulse signal EXTi1 output from the comparator circuit 15 changes. Consequently, a time period for which the switch circuit 16 is turned on is lengthened and controlled to increase the output voltage Vout1. The first switching regulator 2 repeats the above-described operations to control the output voltage Vout1 to a predetermined constant voltage.

Similarly, in the second switching regulator 3, when the output voltage Vout2 increases, a voltage of the error signal EAo2 output from the error amplification circuit 23 decreases. Accordingly, a pulse width of the pulse signal EXTi2 output from the comparator circuit 25 changes. Consequently, a time period for which the switch circuit 26 is turned on is shortened and controlled to decrease the output voltage Vout2. By contrast, when the output voltage Vout2 decreases, a voltage of the error signal EAo2 output from the error amplification circuit 23 increases. Accordingly, a pulse width of the pulse signal EXTi2 output from the comparator circuit 25 changes. Consequently, a time period for which the switch circuit 26 is turned on is lengthened and controlled to increase the output voltage Vout2. The second switching regulator 3 repeats the above-described operations to control the output voltage Vout2 to a predetermined constant voltage.

Figure 8:
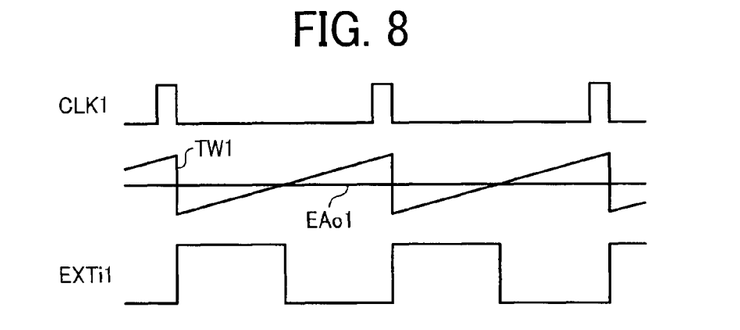
FIG. 8 is a timing chart illustrating an example of signals of a first switching regulator included in the switching power supply circuit shown in FIG. 7.

FIG. 8 is a timing chart illustrating an example of signals of the first switching regulator 2 depicted in FIG. 7, when an electric current flown to the load 10 depicted in FIG. 7 maintains a constant value stably.

A falling edge of the clock signal CLK1 controls the triangular wave generation circuit 14 depicted in FIG. 7 to generate the triangular wave signal TW1. The triangular wave signal TW1 output from the triangular wave generation circuit 14 and the error signal EAo1 output from the error-amplification circuit 13 are input to the comparator circuit 15 depicted in FIG. 7. When a voltage of the error signal EAo1 is higher than a voltage of the triangular wave signal TW1, the pulse signal EXTi1 is at a high level. When a voltage of the error signal EAo1 is lower than a voltage of the triangular wave signal TW1, the pulse signal EXTi1 is at a low level.

Figure 9:
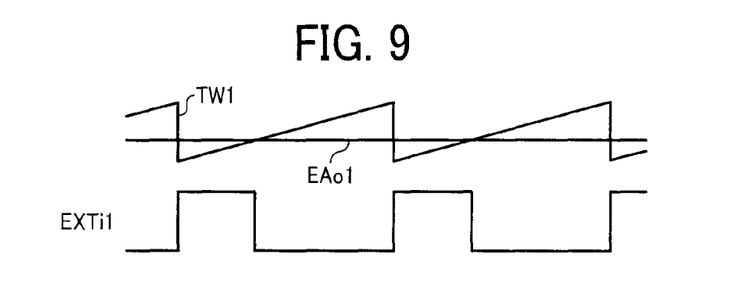
FIG. 9 is a timing chart illustrating another example of signals of a first switching regulator included in the switching power supply circuit shown in FIG. 7.

When load is light, that is, when a decreased electric current is flown to the load 10, the output voltage Vout1 increases in a duty cycle of the pulse signal EXTi1 shown in FIG. 8. Therefore, when the output voltage Vout1 increases, a voltage of the error signal EAo1 becomes lower to decrease the duty cycle of the pulse signal EXTi1, so as to control the output voltage Vout1 to a constant voltage, as illustrated in FIG. 9.

Figure 10:
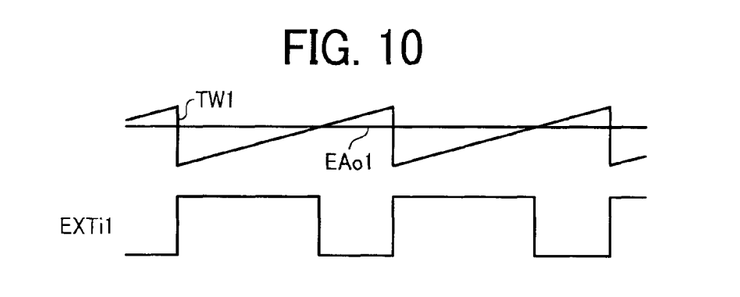
FIG. 10 is a timing chart illustrating yet another example of signals of a first switching regulator included in the switching power supply circuit shown in FIG. 7.

By contrast, when load is heavy, that is, when an increased electric current is flown to the load 10, the output voltage Vout1 decreases in a duty cycle of the pulse signal EXTi1 shown in FIG. 8. Therefore, when the output voltage Vout1 decreases, a voltage of the error signal EAo1 becomes higher to increase the duty cycle of the pulse signal EXTi1, so as to control the output voltage Vout1 to a constant voltage, as illustrated in FIG. 10.

Figure 11:
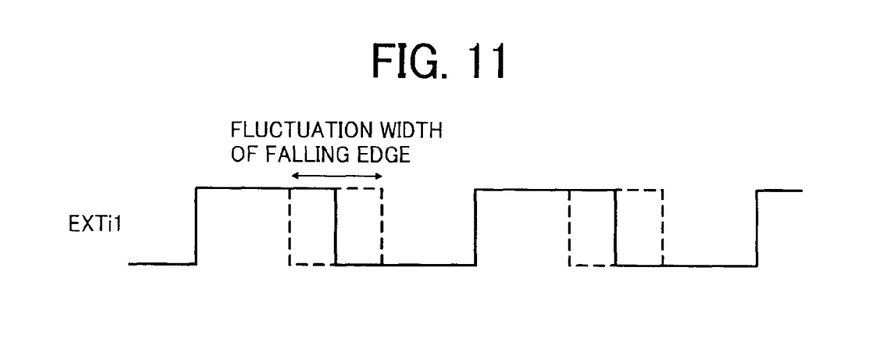
FIG. 11 is a diagram illustrating an example of a pulse signal of the switching power supply circuit shown in FIG. 7.

Thus, a falling edge of the pulse signal EXTi1 fluctuates depending on a state of load, as illustrated in FIG. 11. The above-described operations of the first switching regulator 2 are applicable to the second switching regulator 3 depicted in FIG. 7, and thereby descriptions about operations of the second switching regulator 3 are omitted.

Figure 12:
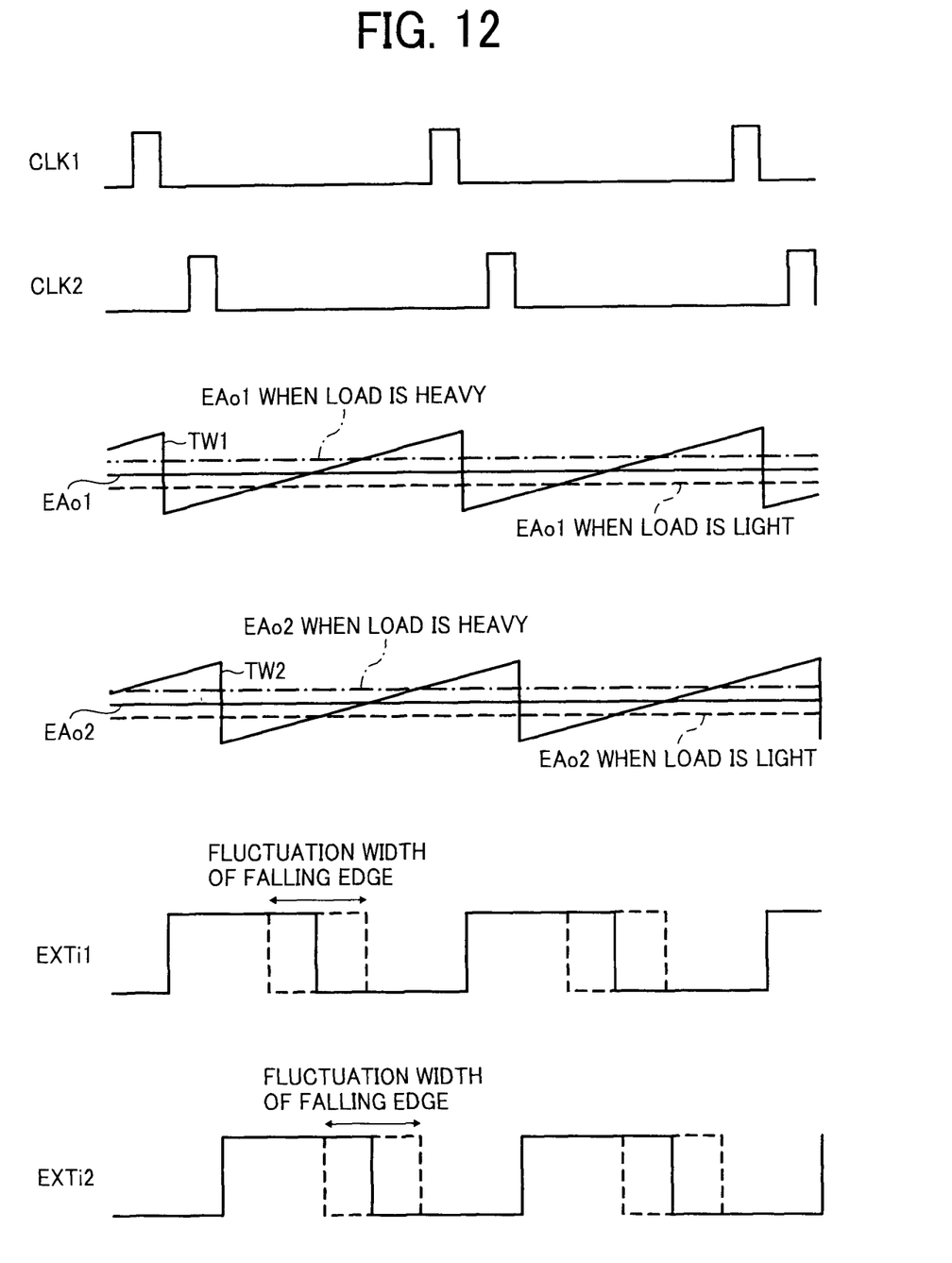
FIG. 12 is a timing chart illustrating an example of signals of the switching power supply circuit shown in FIG. 7.

FIG. 12 is a timing chart illustrating an example of signals shown in FIG. 7. As illustrated in FIG. 12, the clock signals CLK1 and CLK2 output from the clock generation circuit 4 depicted in FIG. 7 have phases different from each other. Accordingly, the triangular wave signals TW1 and TW2 output from the triangular wave generation circuits 14 and 24 depicted in FIG. 7, respectively, have phases different from each other.

FIG. 12 illustrates fluctuation of the error signals EAo1 and EAo2 output from the error amplification circuits 13 and 23 depicted in FIG. 7, respectively, caused by fluctuation of load. FIG. 12 also illustrates fluctuation of the pulse signals EXTi1 and EXTi2 output from the comparator circuits 15 and 25 depicted in FIG. 7, respectively, caused by the fluctuation of the error signals EAo1 and EAo2. States of the loads 10 and 20 depicted in FIG. 7 fluctuate independently. Rising edges of the pulse signals EXTi1 and EXTi2 do not fluctuate due to fluctuation of the loads 10 and 20, but falling edges of the pulse signals EXTi1 and EXTi2 fluctuate. Accordingly, a fluctuation width of the falling edge of the pulse signal EXTi1 overlaps a fluctuation width of the falling edge of the pulse signal EXTi2. Namely, the falling edge of the pulse signal EXTi1 may overlap the falling edge of the pulse signal EXTi2. In order to prevent the falling edge of the pulse signal EXTi1 from overlapping the falling edge of the pulse signal EXTi2, the timing adjustment circuit 5 depicted in FIG. 7 adjusts timings of the falling edges of the pulse signals EXTi1 and EXTi2, and outputs the adjusted pulse signals to the switch circuits 16 and 26 depicted in FIG. 7 as the pulse signals EXTo1 and EXTo2, respectively. The switch circuits 16 and 26 are turned on and off according to the input pulse signals EXTo1 and EXTo2, respectively.

Figure 13:
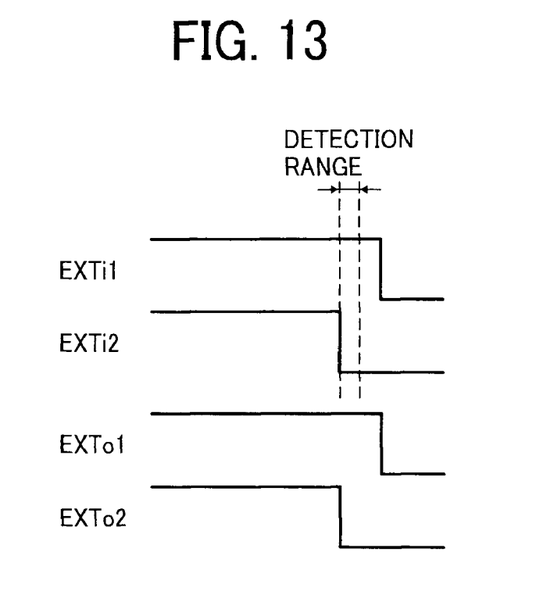
FIG. 13 is a diagram illustrating an example of pulse signals input to and output from a timing adjustment circuit included in the switching power supply circuit shown in FIG. 7.

The following describes operations of the timing adjustment circuit 5 in detail. FIG. 13 is a timing chart illustrating an example of falling edges of the pulse signals EXTi1 and EXTi2 input to the timing adjustment circuit 5 depicted in FIG. 7 and the pulse signals EXTo1 and EXTo2 output from the timing adjustment circuit 5.

The timing adjustment circuit 5 monitors phases of the input pulse signals EXTi1 and EXTi2, respectively, and adjusts the phases of the pulse signals EXTi1 and EXTi2 so that the falling edge of the pulse signal EXTi1 does not overlap the falling edge of the pulse signal EXTi2. The timing adjustment circuit 5 generates and outputs the adjusted pulse signals as the pulse signals EXTo1 and EXTo2, respectively.

FIG. 13 illustrates the pulse signals EXTi1 and EXTi2 when the falling edge of the pulse signal EXTi1 enters the timing adjustment circuit 5 depicted in FIG. 7 before the falling edge of the pulse signal EXTi2 enters the timing adjustment circuit 5. A detection range shown in broken lines in FIG. 13 is set by the timing adjustment circuit 5. The timing adjustment circuit 5 monitors a phase difference between the falling edge of the pulse signal EXTi1 and the falling edge of the pulse signal EXTi2. When the phase difference is larger than the detection range, the timing adjustment circuit 5 does not perform phase control, and causes the pulse signals EXTi1 and EXTi2 to pass through the timing adjustment circuit 5 so as to be output as the pulse signals EXTo1 and EXTo2, respectively. The detection range detected by the timing adjustment circuit 5 may be adjusted to an arbitrary range.

Figure 14:
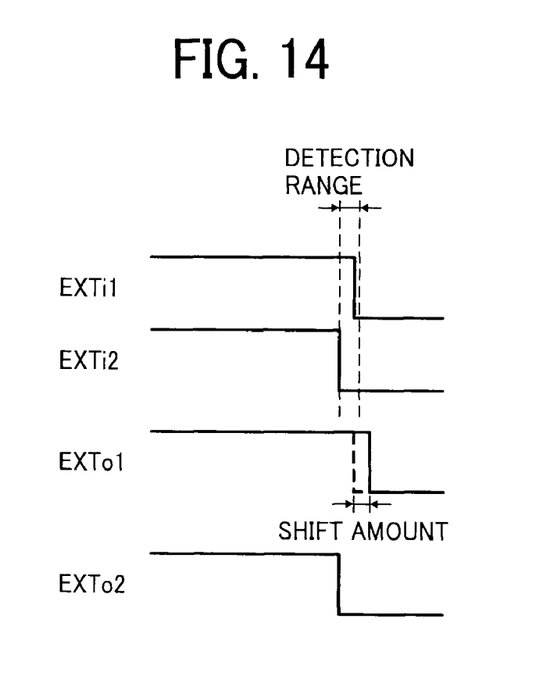
FIG. 14 is a diagram illustrating another example of pulse signals input to and output from a timing adjustment circuit included in the switching power supply circuit shown in FIG. 7.

FIG. 14 illustrates the pulse signals EXTi1 and EXTi2 when the phase difference between the falling edge of the pulse signal EXTi1 and the falling edge of the pulse signal EXTi2 is within the detection range, when the falling edge of the pulse signal EXTi1 enters the timing adjustment circuit 5 depicted in FIG. 7 before the falling edge of the pulse signal EXTi2 enters the timing adjustment circuit 5.

When the timing adjustment circuit 5 detects that the phase difference between the falling edge of the pulse signal EXTi1 and the falling edge of the pulse signal EXTi2 is within the detection range, the timing adjustment circuit 5 shifts the falling edge of a pulse signal entering the timing adjustment circuit 5 before other pulse signal, for example, the pulse signal EXTi1 to generate the pulse signal EXTo1 so that a timing difference between the falling edge of the pulse signal EXTo1 and the falling edge of the pulse signal EXTo2 is greater than the detection range. A shift amount adjusted by the timing adjustment circuit 5 may be set to an arbitrary amount.

Figure 15:
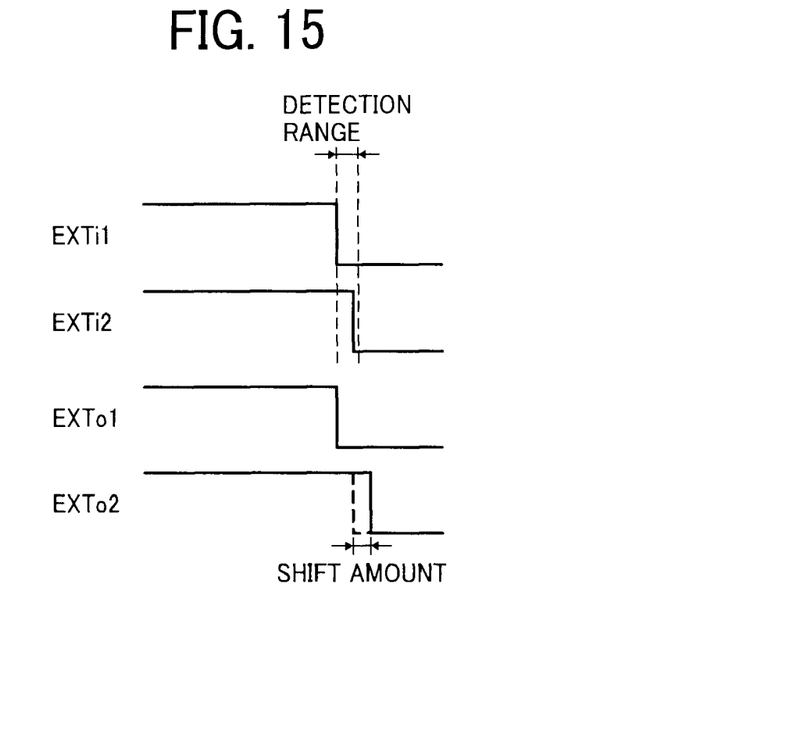
FIG. 15 is a diagram illustrating yet another example of pulse signals input to and output from a timing adjustment circuit included in the switching power supply circuit shown in FIG. 7.

FIG. 15 illustrates the pulse signals EXTi1 and EXTi2 when the phase difference between the falling edge of the pulse signal EXTi1 and the falling edge of the pulse signal EXTi2 is within the detection range, when the falling edge of the pulse signal EXTi2 enters the timing adjustment circuit 5 depicted in FIG. 7 before the falling edge of the pulse signal EXTi1 enters the timing adjustment circuit 5.

The timing adjustment circuit 5 shifts the falling edge of the pulse signal EXTi2, which enters the timing adjustment circuit 5 before the pulse signal EXTi1 does, to generate the pulse signal EXTo2 so that a timing difference between the falling edge of the pulse signal EXTo1 and the falling edge of the pulse signal EXTo2 is greater than the detection range.

As described above, the timing adjustment circuit 5 depicted in FIG. 7 detects the falling edges of the input pulse signals EXTi1 and EXTi2, performs timing adjustment on the falling edges of the pulse signals EXTi1 and EXTi2, generates the adjusted pulse signals as the pulse signals EXTo1 and EXTo2, and outputs the pulse signals EXTo1 and EXTo2 to the switch circuits 16 and 26 depicted in FIG. 7, respectively. Accordingly, a switching phase of the switch circuit 16 of the first switching regulator 2 depicted in FIG. 7 does not overlap a switching phase of the switch circuit 26 of the second switching regulator 3 depicted in FIG. 7. Especially, a timing at which the switch circuit 16 is turned off and interrupted does not overlap a timing at which the switch circuit 26 is turned off and interrupted.

Figure 16:
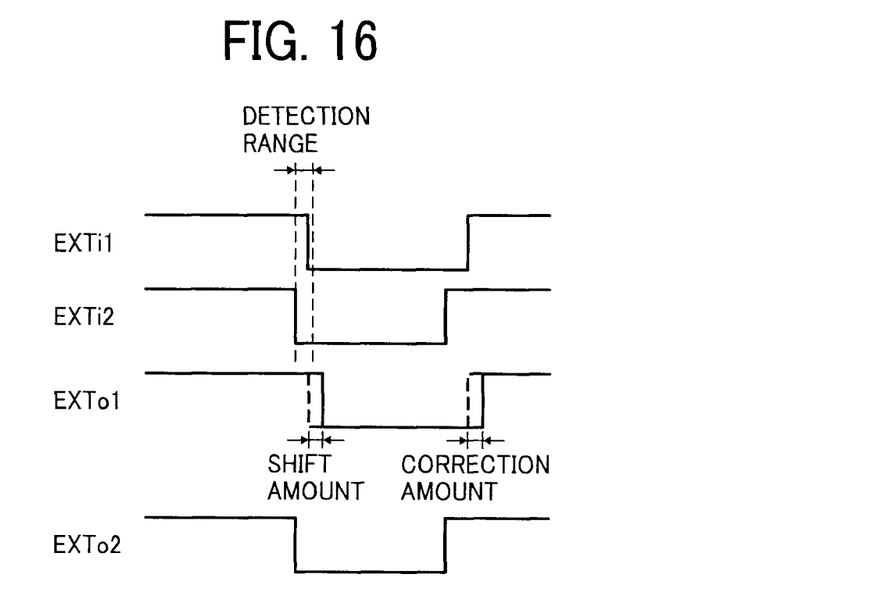
FIG. 16 is a diagram illustrating yet another example of pulse signals input to and output from a timing adjustment circuit included in the switching power supply circuit shown in FIG. 7.

FIG. 16 illustrates the pulse signals EXTi1 and EXTi2 when the phase difference between the falling edge of the pulse signal EXTi1 and the falling edge of the pulse signal EXTi2 is within the detection range, when the falling edge of the pulse signal EXTi1 enters the timing adjustment circuit 5 depicted in FIG. 7 before the falling edge of the pulse signal EXTi2 enters the timing adjustment circuit 5.

The timing adjustment circuit 5 shifts the falling edge of the pulse signal EXTo1 by a shift amount between a broken line and a solid line. In other words, the timing adjustment circuit 5 shifts the falling edge of the pulse signal EXTo1 from a position shown in the broken line to a position shown in the solid line. The timing adjustment circuit 5 also shifts the rising edge of the pulse signal EXTo1 by an amount corresponding to the shift amount of the falling edge of the pulse signal EXTo1. Namely, the timing adjustment circuit 5 performs correction to cause a duty cycle of the pulse signal EXTo1 to be identical with a duty cycle of the pulse signal EXTi1. Accordingly, a switching phase of the switch circuit 16 of the first switching regulator 2 depicted in FIG. 7 does not overlap a switching phase of the switch circuit 26 of the second switching regulator 3 depicted in FIG. 7, suppressing fluctuation of the output voltages Vout1 and Vout2 caused by the timing adjustment.

According to the above-described embodiments, the timing adjustment circuit 5 detects the falling edges of the pulse signals EXTi1 and EXTi2 as one example. Alternatively, the timing adjustment circuit 5 may detect rising edges of the pulse signals EXTi1 and EXTi2 to adjust timings of the rising edges of the pulse signals EXTi1 and EXTi2.

Further, according to the above-described embodiments, the switching power supply circuit 1 depicted in FIG. 7 includes two switching regulators, that is, the first switching regulator 2 and the second switching regulator 3, as one example. Alternatively, the switching power supply circuit 1 may include three or more switching regulators.

Further, according to the above-described embodiments, each of the first switching regulator 2 and the second switching regulator 3 serves as a step-down switching regulator. Alternatively, the above-described embodiments are applicable to a step-up switching regulator. The timing adjustment circuit 5 may perform the above-described operations for the step-up switching regulator, and thereby descriptions of operations of the timing adjustment circuit 5 for the step-up switching regulator are omitted.

In the switching power supply circuit 1 according to the above-described embodiments, the timing adjustment circuit 5 performs phase adjustment on pulse signals and outputs the adjusted pulse signals to the switch circuits 16 and 26 of the first switching regulator 2 and the second switching regulator 3, respectively, so that the pulse signals generated by the first switching regulator 2 and the second switching regulator 3 can have phases different from each other. Thus, superimposition of noise on a power supply voltage or a ground voltage caused by an overlap of turning on and off of the switch circuits 16 and 26 can be prevented. Accordingly, malfunction of the switching power supply circuit 1 caused by noise or an influence on a peripheral circuit can be prevented.

A predetermined time period corresponding to the detection range used for judging an overlap of the falling edges or the rising edges of the pulse signals EXTi1 and EXTi2 can be adjusted to determine a proper range for preventing an overlap of the switching phases of the switch circuits 16 and 26.

Either the falling edges or the rising edges of the pulse signals EXTi1 and EXTi2 can be detected, improving versatility of adjustment.

Fluctuation of a duty cycle caused by timing adjustment performed on the pulse signals EXTi1 and EXTi2 can be corrected to decrease fluctuation of an output voltage.

A predetermined time period and/or an amount of timing adjustment can be changed to improve flexibility of timing adjustment. Thus, the timing adjustment is available for various combinations of switching regulators.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments may be combined with each other and/or substituted for each other within the scope of this disclosure and appended claims.

This patent specification is based on Japanese Patent Application No. 2008-020320 filed on Jan. 31, 2008 in the Japan Patent Office, the entire contents of which are hereby incorporated herein by reference.

What is claimed is:
1. A switching power supply circuit, comprising:
a plurality of switching regulators configured to convert an input voltage input to an input terminal into a plurality of predetermined constant voltages and to output the plurality of predetermined constant voltages from a plurality of output terminals, respectively,
each of the plurality of switching regulators comprising:
a switch circuit configured to perform switching according to an input control signal;
a coil charged with the input voltage by the switching performed by the switch circuit; and
a control circuit configured to compare a voltage of a triangular wave signal with a voltage of an error signal, the error signal being obtained by amplifying a difference voltage corresponding to a difference between (a) a proportional voltage that is proportional to an output voltage output from the output terminal and (b) a predetermined reference voltage,
the control circuit configured to output a pulse signal indicating a result of the comparison of said voltage of the triangular wave signal with said voltage of the error signal, to control the switching performed by the switch circuit; and
a timing adjustment circuit configured to receive a plurality of said pulse signals generated by respective ones of the plurality of switching regulators, adjust phases of the plurality of pulse signals generated by the plurality of switching regulators to generate a plurality of adjusted pulse signals, such that phases of each of the plurality of adjusted pulse signals are different from each other, and to output the plurality of adjusted pulse signals to the respective switch circuits of the plurality of switching regulators.

2. The switching power supply circuit according to claim 1, wherein the timing adjustment circuit detects edges of the plurality of pulse signals for turning off and interrupting the switch circuits, adjusts timings of the edges of the plurality of pulse signals to be shifted from each other by at least a predetermined time period, and outputs the plurality of adjusted pulse signals to the respective switch circuits.

3. The switching power supply circuit according to claim 2, wherein the timing adjustment circuit adjusts a timing of a first-input pulse signal among the plurality of pulse signals when the timing adjustment circuit detects the edges of the plurality of pulse signals.

4. The switching power supply circuit according to claim 3, wherein the timing adjustment circuit corrects fluctuation of a duty cycle caused by the timing adjustment by adjusting a timing of an edge for turning on the switch circuit to be conductive.

5. The switching power supply circuit according to claim 2, wherein the timing adjustment circuit changes the predetermined time period used for adjusting the timings of the edges of the plurality of pulse signals to be shifted from each other.

6. The switching power supply circuit according to claim 2, wherein the timing adjustment circuit changes an amount of the timing adjustment.

7. The switching power supply circuit according to claim 1, wherein the timing adjustment circuit adjusts the plurality of pulse signals to generate the plurality of adjusted pulse signals, such that a phase difference between the plurality of adjusted pulse signals is greater than a predetermined time period.

8. The switching power supply circuit according to claim 1, wherein the timing adjustment circuit determines whether a first phase difference between the plurality of pulse signals is within a predetermined time period, and if the timing adjustment circuit determines that the first phase difference between the plurality of pulse signals is within the predetermined time period, then the timing adjustment circuit adjusts the plurality of pulse signals to generate the plurality of adjusted pulse signals, such that a second phase difference between the plurality of adjusted pulse signals is greater than the predetermined time period.

9. The switching power supply circuit according to claim 1, wherein the timing adjustment circuit determines whether a first phase difference between the plurality of pulse signals is greater than a predetermined time period, and if the timing adjustment circuit determines that the first phase difference between the plurality of pulse signals is greater than the predetermined time period, then the timing adjustment circuit does not adjust the plurality of pulse signals.

10. The switching power supply circuit according to claim 1, wherein the timing adjustment circuit adjusts the phases of the plurality of pulse signals to generate the plurality of adjusted signals, such that falling edges of each of the plurality of adjusted pulse signals are not within a predetermined time period of each other.

11. The switching power supply circuit according to claim 1, wherein each of the plurality of pulse signals, received by the timing adjustment circuit from respective ones of the plurality of switching regulators, indicates the result of said comparison performed by the control circuits of the respective ones of the plurality of switching regulators.

12. The switching power supply circuit according to claim 1, wherein each of the plurality of adjusted pulse signals generated by the timing adjustment circuit are output directly to the respective switch circuits of the plurality of switching regulators.

13. The switching power supply circuit according to claim 1, wherein each of the plurality of adjusted pulse signals generated by the timing adjustment circuit are used by the respective switch circuits of the plurality of switching regulators to perform output control of the input voltage input to the input terminal.

* * * * *